United States Patent [19]
Abarotin

[11] 3,786,697
[45] Jan. 22, 1974

[54] METHOD AND APPARATUS FOR PREPARING THE ENDS OF CABLES FOR SPLICING

[75] Inventor: Eugene V. Abarotin, Franklin Twp., Westmoreland County, Pa.

[73] Assignee: United States Steel Corporation, Pittsburgh, Pa.

[22] Filed: Apr. 12, 1972

[21] Appl. No.: 243,331

[52] U.S. Cl. .............................................. 81/9.51
[51] Int. Cl. .............................................. H02g 1/12
[58] Field of Search ............... 81/9.51, 9.5 R, 9.5 A; 30/90.1, 91.2, 90.6, 90.7

[56] References Cited
UNITED STATES PATENTS
| | | | |
|---|---|---|---|
| 3,212,369 | 10/1965 | Way | 30/90.6 X |
| 2,395,374 | 2/1946 | Lembitz et al. | 81/9.51 |
| 3,151,510 | 10/1964 | Bunker et al. | 30/90.6 |
| 3,706,241 | 12/1972 | Balmer et al. | 81/9.51 |

Primary Examiner—Donald G. Kelly
Assistant Examiner—Roscoe V. Parker
Attorney, Agent, or Firm—Donald S. Ferito

[57] ABSTRACT

To prepare a multi-conductor jacketed cable for splicing it is necessary to remove the jacket for some distance from the end of the cable and to cut the conductors so that they extend for different distances from the end of the jacket. This is done by first gripping the cable by a clamp some distance from its end. Longitudinally spaced pairs of cutters are then brought together to cut through the conductors and through the jacket to the conductors with the cut through the conductors being spaced toward the clamp from the end of the cable a greater distance than the cut through the conductors. The clamp is then moved away from the cutters so as to pull the main portion of the cable with it while leaving the portions of the jacket and conductors between the cutters and the end of the cable behind.

5 Claims, 10 Drawing Figures

METHOD AND APPARATUS FOR PREPARING THE ENDS OF CABLES FOR SPLICING

This invention relates to a method and apparatus for preparing the ends of multi-conductor jacketed conductors for splicing and more particularly to mine cables having two conductors and a ground lead. The cable splicing is generally required to increase its length or because of damage to its insulation, conductors or ground leads. Before the conductors can be joined, a part of the cable jacket must be removed, the conductors and ground leads cut to proper lengths, and the insulation removed from the ends of the conductors. Two conductor ends with the same polarity are then inserted into a copper sleeve from the opposite ends and the ends of this sleeve are crimped, thus joining the previously severed conductors. By insulating the conductors from each other and from the ground lead, and putting a jacketing material around them all, the splice is completed.

Usually the jacket has been removed by means of a penknife and the conductors have been cut with pliers. Stripping with a penknife is very difficult and often results in damaging the conductor insulation. This damage may remain unnoticed and may result in a short circuit. The conductors, after crimping, must be of the same length since otherwise the short conductor will take the total tension applied to the cable and may break. It is very difficult to cut the conductors with hand tools to obtain this equal length.

It is therefore an object of my invention to provide apparatus which will accurately cut each conductor and ground lead of a jacketed multi-conductor cable to a predetermined length.

Another object is to provide such apparatus which will also accurately strip the jacket from a predetermined portion of the cable without damaging the conductor insulation.

Still another object is to provide a method of cutting the conductors of a jacketed multi-conductor cable to predetermined lengths and at the same time removing the jacket from a predetermined portion of the cable without damaging the conductor insulation.

These and other objects will be more apparent after referring to the following specification and attached drawings, in which.

Figure 1:
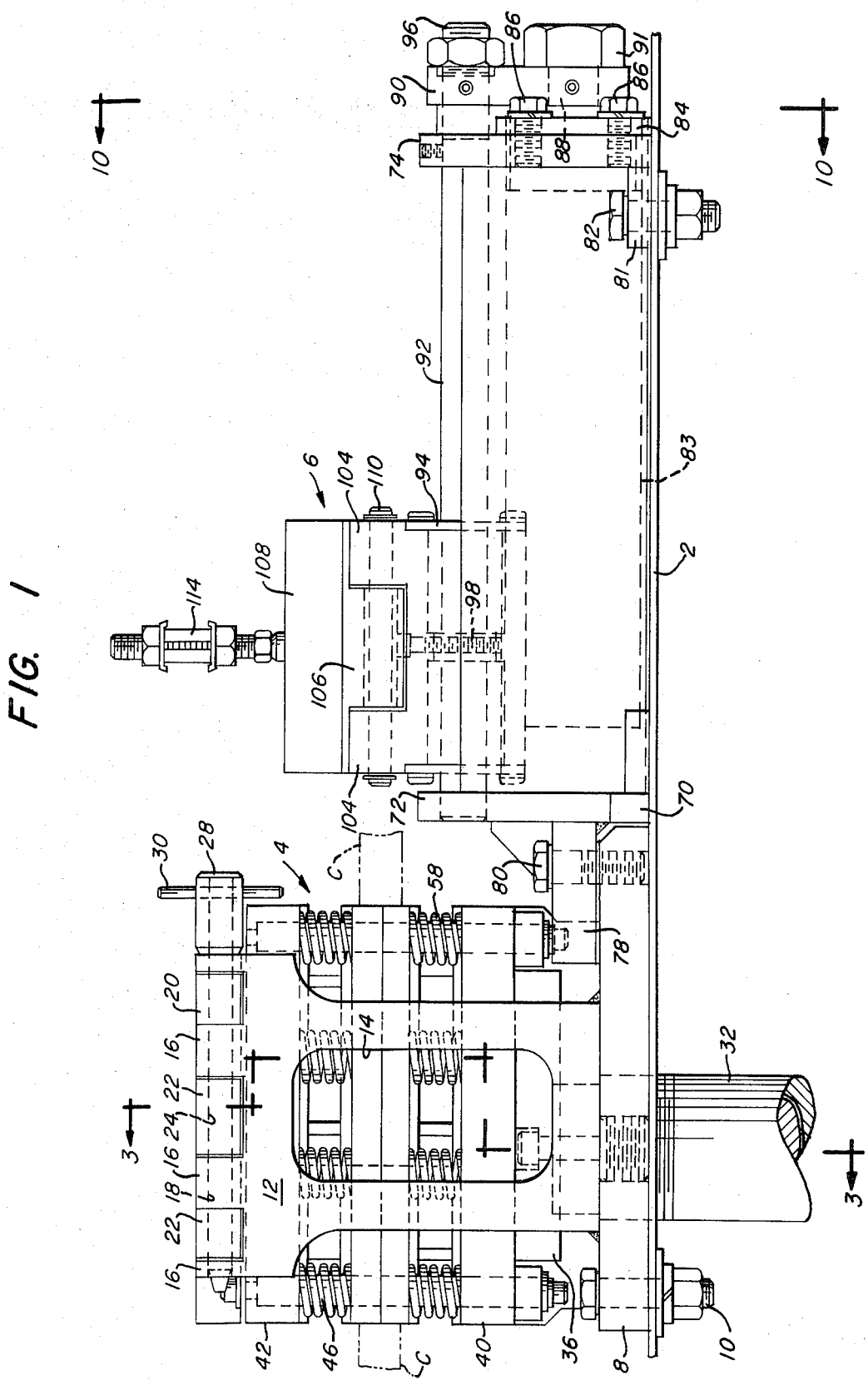
FIG. 1 is a side elevation of the apparatus of my invention.
Figure 2:
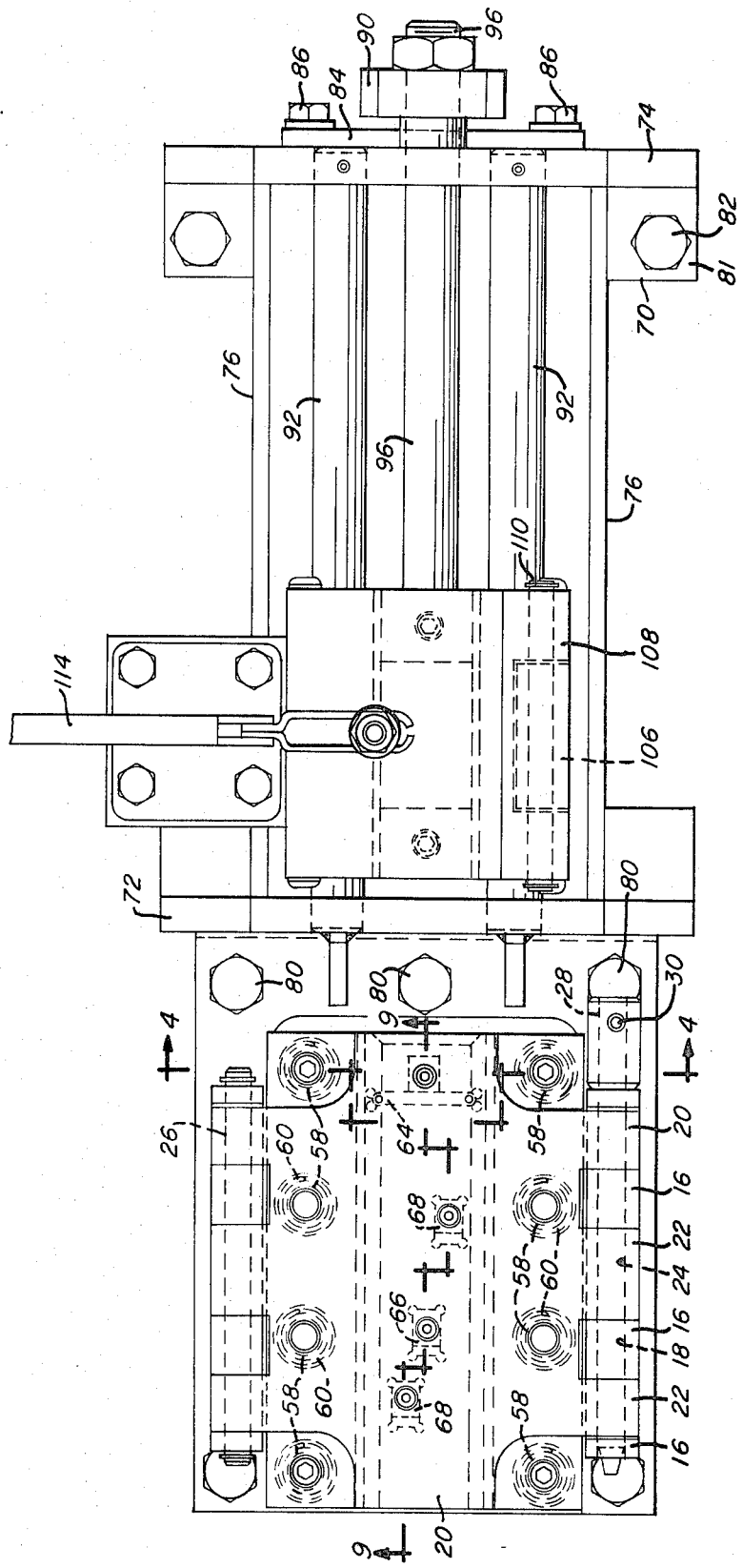
FIG. 2 is a top plan view of FIG. 1.

Referring more particularly to the drawings, reference numeral 2 indicates a table top for supporting step cutter 4 and cable stripper 6 of my invention. Step cutter 4 includes a base plate 8 attached by means of bolts 10 to table top 2. Transversely spaced apart vertical plates 12 welded to plate 8, have aligned openings 14 therethrough. The top of each plate 12 has spaced lugs 16 extending upwardly with aligned circular holes 18 therethrough. A cover plate 20 has similar lugs 22 on each end which are received between lugs 16. Holes 24 in lugs 22 are aligned with the holes 18 so as to receive pins 26 and 28. Pin 26 serves as a pivot for the cover plate 20 while pin 28 has a transverse pin 30 attached to one end so as to facilitate its removal when it is desired to swing the cover plate 20 into inoperative position. The foregoing forms a housing 31.

Figure 3:
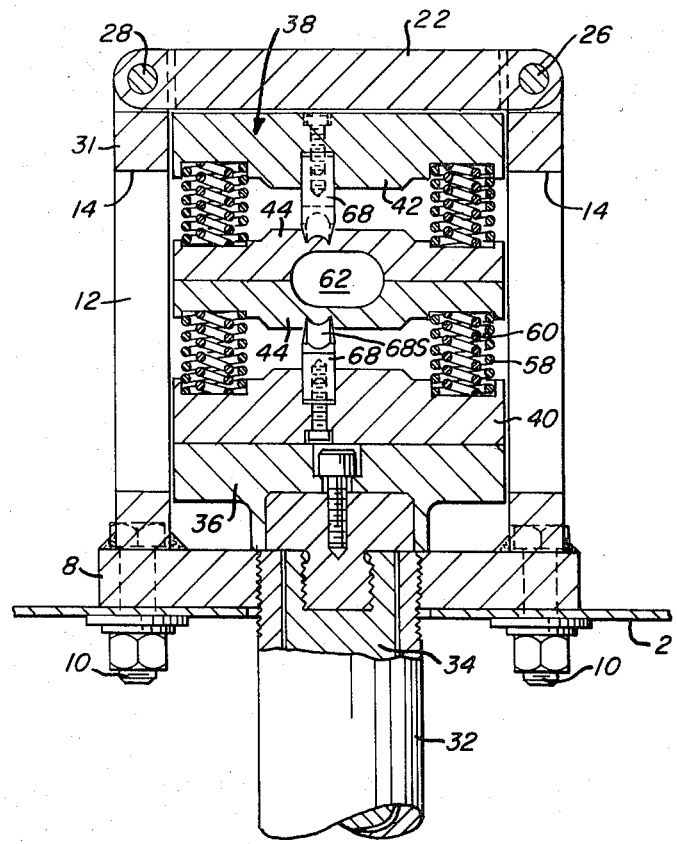
FIG. 3 is a view taken on the line III—III OF FIG. 1.

As best shown in FIG. 3 a fluid cylinder 32 extends upwardly through and is threaded into a hole in plate 8. A piston rod 34 mounted in cylinder 32 has a pressure plate 36 secured to its upper end above plate 8.

Figure 4:
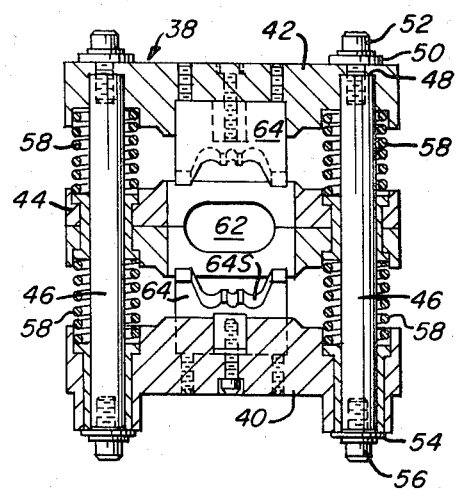
FIG. 4 is a view taken on the line IV—IV of FIG. 2 with parts removed so as to show only the die block.
Figure 5:
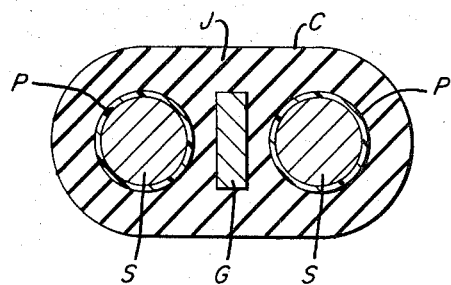
FIG. 5 is a sectional view of a cable to be prepared.

A step cutter die block 38 is mounted on plate 36 in housing 31 between plates 12. The die block 38 includes bottom blade plate 40, top blade plate 42, and intermediate guide plates 44 mounted on four vertical rods 46. Plate 42 is secured to each rod 46 between shoulder 48 and washer 50 by means of capscrew 52 threaded into the top of the rod. Downward movement of plate 40 is limited by means of washers 54 held in place by means of capscrews 56 threaded into rods 46. Plates 44 are held assembled together so that they can be considered a single plate. Two springs 58 surround each rod 46, one bearing against the top of plate 40 and the bottom of lower intermediate plate 44 and the other bearing against the top intermediate plate 44 and the bottom of plate 42. Sets of spring 58 and spring 60 are similarly positioned in four locations between the rods 46. The springs 58 and 60 are precompressed at assembly to support plates 44 with its cable guide opening 62 centered between plates 40 and 42 as best shown in FIGS. 3 and 4.

One type of cable C with which my device may be used includes a rectangular ground wire G, two conductor strands S, each surrounded by a plastic insulator P, and a rubber jacket J. For this cable the opening 62 will be shaped as shown. The remaining parts of the die block 38 will also be described with reference to this cable.

Figure 7:
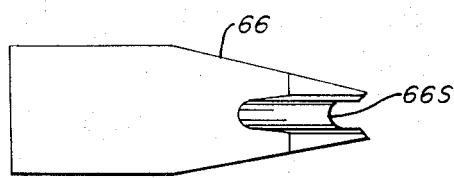
FIG. 7 is a view of the ground cutting blade.
Figure 8:
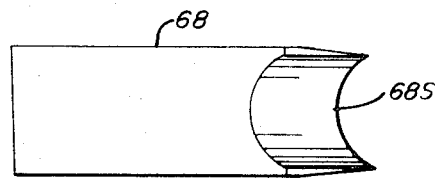
FIG. 8 is a view of a cutting blade.
Figure 9:
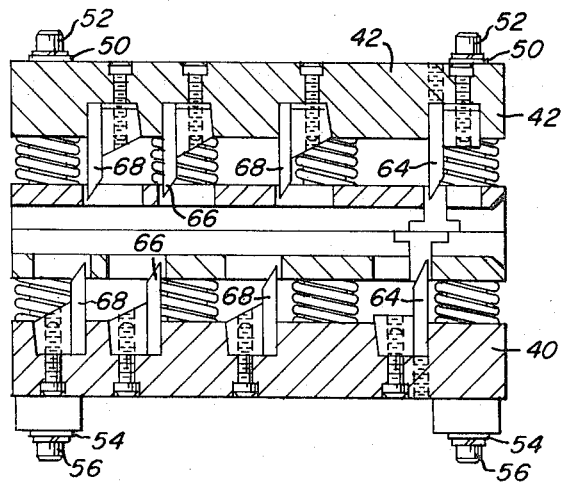
FIG. 9 is a view taken on the line IX—IX of FIG. 2.

As best shown in FIG. 9 the bottom plate 40 supports a notching blade 64, a ground cutting blade 66, and two conductor cutting blades 68. In like manner the top plate 42 supports a notching blade 64, a ground cutting blade 66, and two conductor blades 68 which are positioned to cooperate with the corresponding blades in the bottom plate. It will be seen that each blade 64 has a curve cutting surface 64S (FIG. 4) of less width than the width of cable C, but of slightly greater width than the distance between the outside of insulated conductors S so that the jacket J will be cut but the conductors and their insulation will not be cut. Each blade 66 has a cutting surface 66S (FIG. 7) of such dimension that the blades 66 will cut through ground G without cutting conductors S or their insulation. Each blade 68 has a cutting surface 68S (FIG. 8) of such dimension that each set of blades 68 will cut through one of the conductors S without cutting ground G or the other conductor S. The spacing, configuration and size of the blades depends upon the size and construction of the cable. Hydraulic fluid is preferably provided for cylinders 32 and 83 by means of a manually operated pump (not shown).

Figure 10:
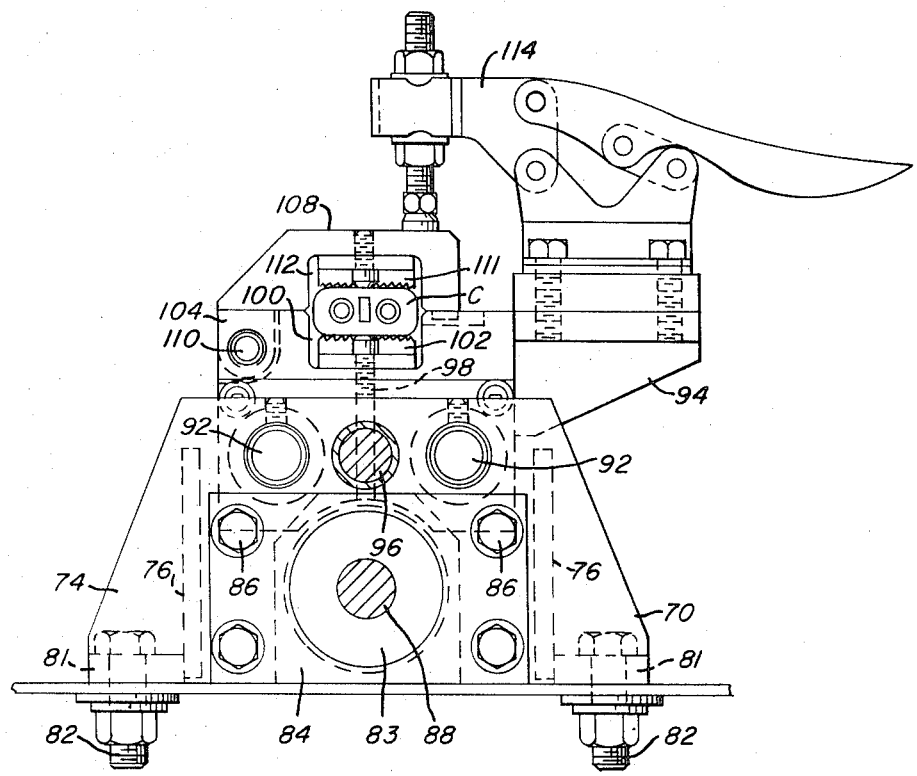
FIG. 10 is a view taken on the line X—X of FIG. 2.

The cable stripper 6 is positioned adjacent the end of step cutter 4 having the notching blades 64. The stripper 6 includes a base 70 formed of two end plates 72 and 74 connected by and welded to side plates 76. Plate 72 has a horizontal flange 78 secured thereto which rests on plate 8 and is secured thereto by means of capscrews 80. A horizontal fluid cylinder 83 is positioned within base 70 and secured thereto by means of plate 84 and capscrews 86 and plate 74 has horizontal flanges 81 secured thereto which rest on table top 2 and is secured thereto by means of bolts 82. Piston rod 88 extends from the right hand end cylinder 83 (FIG. 1) and has an upwardly extending link 90 secured thereto by means of nut 91. Two parallel spaced apart horizontal rods 92 extend between and are fastened to plates 72 and 74. A clamp carrying block 94 is slidably mounted on rods 92 and is connected to link 90 by means of a horizontal pull rod 96 journaled in the plate 74 between rods 92. The end of rod 96 remote from link 90 is connected to block 94 by pin 98. As best shown in FIG. 10 the block 94 has a recess 100 for receiving a bottom knurled gripping jaw 102. Spaced apart flanges 104 at the upper end of block 94 receive a lug 106 of a clamping cover 108. A pin 110 passing through aligned holes in flanges 104 and lug 106 pivotally connect cover 108 to block 94. The cover 108 has a top knurled gripping jaw 111 received in recess 112. When the jaws are closed they form an opening in line with opening 62 for receiving cable C. Toggle mechanism 114 mounted on block 94 moves clamping cover 108 downwardly about pivot pin 110 to clamp cable C in position.

Figure 6:
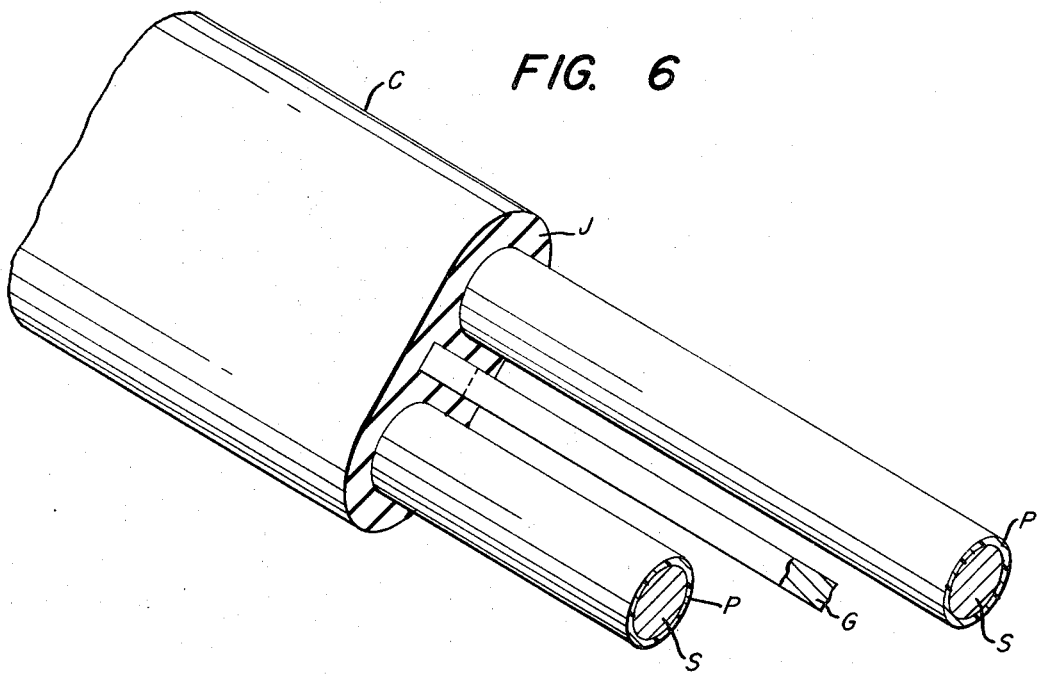
FIG. 6 is a perspective view of a prepared cable.

In operation, with the clamping cover 108 open the end of a cable C is passed into and through opening 62 from the right side (FIG. 1) and laid on gripping jaw 102. The cover 108 is then closed firmly grip the cable C between jaws 102 and 111. Fluid is then delivered into the bottom of cylinder 32 thus raising plate 36 to move plates 40 and 44 upwardly and compressing springs 58 and 60. This movement continues until the blades have penetrated the jacket J to the proper depth and the ground G and conductors S have been severed by blades 66 and 68. Fluid is then delivered into the left end (FIG. 1) of cylinder 83 to push its rod 88 away from the step cutter 4. This moves the clamping block 94 in the same direction, thus pulling the group G and conductors S out of that portion of the jacket S to the left of blades 64. The clamping cover 108 is then opened and then piston rods 34 and 38 returned to their original position. The cable C is removed with its ends being as shown in FIG. 6. The end of a second cable is then prepared in the same manner; the insulation stripped from the conductor ends, connectors positioned around the conductors and crimped thereto, the ends of the conductors insulated, and a new jacket placed about the joint to complete the splice. It will be seen that the cutters can be replaced by other cutters or the entire die block 38 easily removed and replaced by a block of different design for use with other types of cables.

While one embodiment of my invention has been shown and described, it will be apparent that other adaptations and modifications may be made without departing from the scope of the following claims.

I claim:

1. Apparatus for cutting conductors of a multiconductor cable to different lengths and stripping a jacket from the end of the cable which comprises a support; a step cutter mounted on said support, said step cutter including a housing, a die block mounted in said housing and having two sets of opposed blade supports, means mounting a plurality of longitudinally spaced apart blades in each of said blade supports to provide a plurality of pairs of cooperating blades, one pair of said blades being located adjacent one end of said die block and being adapted to cut through said jacket, the other pairs of said blades being longitudinally spaced from each other and located away from said end of said die block; each pair being also transversely spaced from one another and adapted to cut through one of said conductors, means for supporting said cable between said sets of blades, and means for moving said sets of blades together to cut through said jacket to said conductors and to sever said conductors, and a stripper mounted on said support in longitudinal alignment with said step cutter adjacent said one end of said die block, said stripper including gripping means for clamping that portion of said cable extending from said step cutter, and means for moving said gripping means with said cable clamped therein away from said step cutter while said blades are together whereby said jacket is removed from the end of said cable.

2. Apparatus according to claim 1 in which said blade supports are located one above the other, said cable support includes a longitudinal guide opening, and said means for moving said blade supports together includes a fluid motor below said blade supports having a vertical piston rod and means for supporting the lower blade support on said piston rod.

3. Apparatus according to claim 2 in which said die block includes a bottom blade plate forming said bottom blade support, a top blade plate forming said top blade support, a guide plate between said blade plates with said longitudinal guide opening therethrough, a plurality of vertical rods for supporting said plates for movement toward and away from one another, and a pair of springs around each rod one between the bottom blade plate and the guide plate and the other between the top blade plate and the guide plate.

4. Apparatus according to claim 2 in which said stripper includes a base mounted on said support, a clamp carrying block slidably mounted on said base, a fluid motor for moving said block toward and away from said step cutter, a gripping jaw mounted on said block in general alignment with said cable guide opening, a cover pivotally mounted on said block, a gripping jaw mounted on said cover, and means for clamping said cover to said block with said cable between said gripping jaws.

5. Apparatus according to claim 4 in which said die block includes a bottom blade plate forming said bottom blade support, a top blade plate forming said top blade support, a guide plate between said blade plates with said longitudinal guide opening therethrough, a plurality of vertical rods for supporting said plates for movement toward and away from one another, and a pair of springs around each rod one between the bottom blade plate and the guide plate and the other between the top blade plate and the guide plate.

* * * * *